3,438,300
BRACE ROD WASHER
Kenneth M. Blom and Carmen L. Ramirez, Kansas City, Mo., assignors to Butler Manufacturing Company, Kansas City, Mo., a corporation of Missouri
Filed Aug. 17, 1967, Ser. No. 661,399
Int. Cl. F16b 43/02
U.S. Cl. 85—50         2 Claims

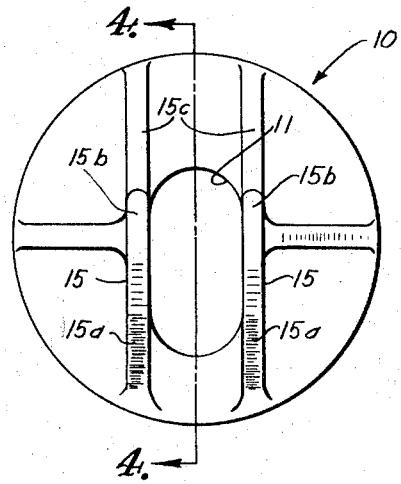
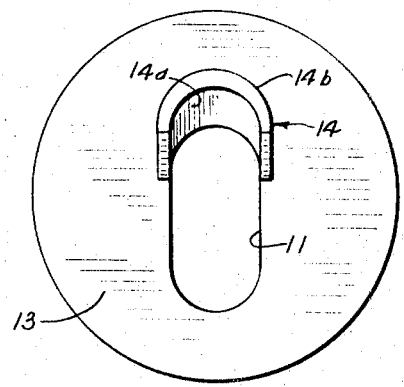
Fig. 1.
Fig. 2.
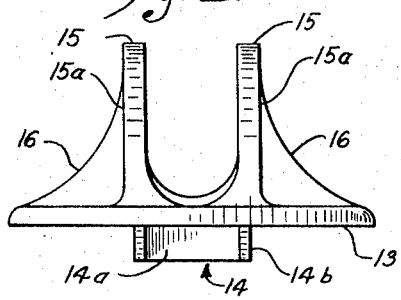
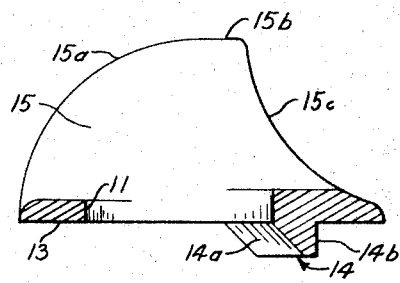
Fig. 3.
Fig. 4.
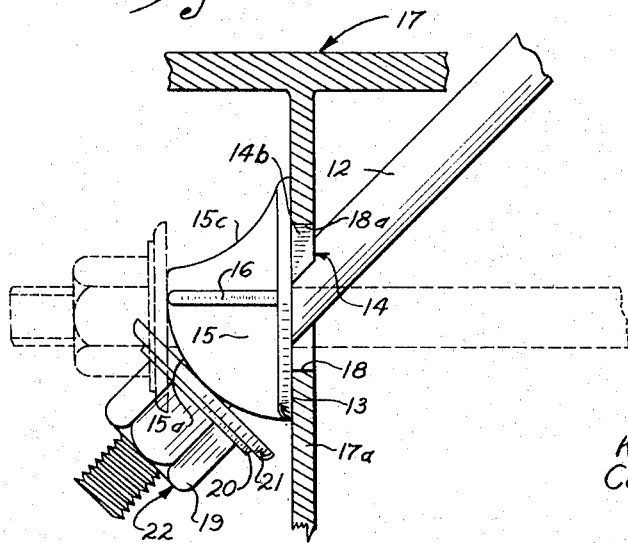
Fig. 5.
INVENTORS
Kenneth M. Blom
Carmen L. Ramirez
BY
ATTORNEYS

# United States Patent Office 3,438,300
Patented Apr. 15, 1969

ABSTRACT OF THE DISCLOSURE

A special load bearing washer to be used in combination with a rod, a fastening means on the end thereof, and a structure having an oversized opening therethrough through which the rod passes, said washer having arcuate bearing surfaces with a center aperture and channel which permits the angular orientation between the rod and the washer and similarily between the rod and the structure to be varied while providing a firm bearing surface between the fastening means and the structure. Included also as a part of the washer is a positioning projection which fits into the oversized opening in the structure for positioning the washer with respect thereto.

Background of the invention

This invention relates to a special bearing washer to be used particularly in the building trade for use with a brace rod angularly oriented with respect to the structural member being braced. In the past, the combination of a half round washer and a standard plate washer has been used for this application. The preceding arrangement had at least one major drawback in that no provisions were made for preventing the rod from binding against the wall in the opening in the structural through which the rod passed. Thus, when tensioning was being applied to the rod by tightening down the fastening means bearing against the washer combination, the rod would bind against the wall of the opening, thereby preventing the rod from being tensioned. To remedy this situation, a pair of rods was used which were connected at adjoining ends by a turnbuckle. Since the joined ends of the rods were oppositely threaded, one having right handed threads and the other left handed, the rod could be tensioned by adjusting a turnbuckle after the rod was placed in the bracing position.

It is readily apparent that the above complex arrangement just described was time consuming to install and required a plurality of parts to complete the assembly. The simplicity of the device which is the subject of this invention and by which this complex arrangement was eliminated, attests to its exceptional novelty and inventiveness. A single washer with arcuate bearing surfaces and rod positioning provisions now provides a firm bearing surface at substantially any brace rod orientation, and additionally provides positioning features that preclude any possibility of the rod binding during tensioning.

Summary of the invention

This invention is a bearing washer of special design that provides a firm bearing surface at substantially all angular orientations between the rod and the structural being braced and which further prevents any binding between the rod and the structural member that would prevent proper rod tensioning. One face of the washer bears against the structural and is substantially flat with a projection protruding therefrom for positioning the washer over an opening in the structural member. The other face has arcuate bearing surfaces with a centrally located channel and aperture. All of the above features are designed and sized to permit the angular orientation of the rod to be varied and to prevent any binding action on the rod that would restrict its longitudinal motion during tensioning.

An object of this invention is to provide a washer that will serve as a bearing surface between a structural member and a fastening device on the end of a brace rod passing therethrough which permits the angular orientation between the brace rod and the structural member and similarly between the brace rod and the washer to be varied. An elongate slot in the washer and a channel formed by arcuate bearing surfaces on one face of the washer is provided to permit angular adjustment of the rod and which is further sized and shaped to prevent any longitudinal binding on the rod while the rod is being tensioned.

Another object of this invention is to provide a bearing washer with rod positioning features that prevent binding engagement of the rod by the wall of the opening in the structure through which the rod passes. The positioning projection from the face of the washer bearing against the structural member prevents the washer from moving as the rod is being tensioned, and the arcuate bearing surfaces on the opposite face of the washer properly locate the rod with respect to the washer so as to prevent any binding. The channel formed between the arcuate bearing surfaces, the aperture in the washer, and the inner wall of the positioning projection are all formed such that the rod is free to move longitudinally while being tensioned. Thus the requirement for two rods joined by a turnbuckle can be replaced by a single standard brace rod.

Still another object of this invention is to provide a single washer to replace a combination of a plate and half round washer that was previously required to provide a bearing surface between a fastening means on the ends of a brace rod and the structural being braced, and which woulld further permit angular orientation of the brace rod with respect to the structural.

Still another object of this invention is to provide a simple means of general application for providing load distribution and reinforcing between a thin webbed structural member and the fastening means on the end of a rod passing therethrough, which further permits the angular relationship between the fastening means and the rod and similarly between the rod and the structure to be varied.

Other and further objects of the invention together with the features of novelty appurtenant thereto will appear in the course of the following description.

Detailed description

In the accompanying drawings, which form a part of the instant specification and are to be read in conjunction therewith, and in which like reference numerals indicate like parts of the various views:

FIG. 1 is a plan view of said washer showing the aperture for receiving the brace rod;

FIG. 2 is another plan view from the side opposite that of FIG. 1;

FIG. 3 is an elevation view of the washer;

FIG. 4 is a sectional view taken along the line 4—4 of FIG. 1 and looking in the direction of the arrows; and FIG. 5 is a view illustrating the washer used in a typical application and shows the washer, nut type fastening means, brace rod, and structural member all in combination, the structural member being shown in section.

Turning now to the drawing in detail, the base portion of the washer 10 is substantially shaped in the form of a flat disc with an elongate center aperture 11. The aperture is wide enough to loosely accept a brace rod 12 (FIG. 5) passing therethrough, and has semicircular ends of a slightly larger diameter than the rod. One face 13 of the washer is substantially flat and has a positioning projection 14 immediately adjacent to one end of the aperture 11. The inner wall 14a of this projection follows the general outline of the semicircular end of the aperture 11 and is also outwardly inclined at an angle of approximately 40° as shown in FIGURE 4. Thus a trough-like inner surface is formed having a slightly greater radius than that of the brace rod. The outward inclination and the semicircular configuration of the trough plus the loose fit of the washer aperture minimizes the chance of any binding on the rod. Thus free longitudinal motion of the rod is insured during tightening. The outer wall 14b of the projection can be of a variety of configurations but in the embodiments shown is also arcuate, similar to the inner wall.

Extending from the face of the washer opposite the positioning projection 14 are two parallel ears 15 having arcuate load bearing surfaces 15a. These ears are positioned adjacent to the elongated side edges of the washer aperture 11 and are shown in FIGS. 1, 4 and 5 as extending completely across the washer face. The outer bearing surface 15a is in each case shaped in an approximately 90° arc with a short horizontal segment 15b over the center portion of the washer. The remainder 15c is contoured in a reverse arc communicating between the end of the bearing surface and the face of the washer. The confronting walls of the two load bearing ears are substantially flat and are positioned far enough apart to loosely accept the brace rod therebetween, thus serving as further insurance against any rod binding. The outer walls of the ears are reinforced by gussets 16 between the wall and the face of the washer. The rigidity thus provided eliminates any chance of the ears collapsing under normal bearing loads.

The typical employment of the invention is shown in FIG. 5 in which a brace rod 12 is being used to brace a structural member 17, the latter shown in section. The end of the rod passes through an oversized aperture 18 in the structural member 17 and then similarly through the aperture 11 in the washer. The aperture 18 in the structural member 17 is preferably round, and must be of a smaller diameter than the face of the washer. The end of the brace rod shown is threaded to accept a hexagonal nut 19 which in combination with the pair of flat washers 20, 21 make up a fastening means 22. The inner washer of the fastening means bears against the bearing surfaces 15a, 15b on the load bearing ears 15. As the nut is tightened down, the flat face 13 of the brace rod washer is urged against the web of the structural member 17a. The positioning projection 14 is secured in the aperture 18 in the structural member and is engaged by the aperture wall 18a. As the nut is additionally tightened, the washer is restrained from further movement by the load on the bearing ears 15 and the positioning projection 14 abutting against the aperture wall 18a. Thus a firm bearing surface is established between the fastening means 22 and the structural member 17.

As can be seen in FIG. 5 the angle at which the brace rod is employed can vary throughout the range provided by the arcuate ears and still not significantly alter the bearing capabilities of the washer. Two positions are shown in FIG. 5 for illustrative purposes, where in one case the brace rod is disposed at an acute angle of approximately 40° and in the other at an angle normal to the flat surface of the structural member.

As can be also seen in FIG. 5, the flat side 13 of the washer provides an efficient means for distributing the rod load over the area of contact between the web 17a and the washer. Thus the web is effectively reinforced throughout the area of contact. This feature is extremely important in thin webbed structurals. The wide distribution of load also permits the aperture in the structural member to be oversized sufficiently to permit acceptance of the positioning projection 14 at any clockwise orientation. Thus a simple oversized circular aperture can be provided in the web which will suffice for any angular orientation of the brace rod.

Although this washer is primarily intended to be used in the building industry for use in combination with a brace rod, other applications are anticipated. In almost any application requiring a rod to be oriented at an angle with a structure and where there is need for a bearing washer between the fastening means on the end of the rod and the structure, this washer would be superior to any washer or combination of washers previously available.

From the foregoing, it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention, it is to be understood that all matter herein set forth or shown in the accompanying drawings is to be interpreted as illustrative and not in a limiting sense.

Having thus described our invention, we claim:

1. A special load bearing washer in combination with a structure having an opening therethrough, a rod loosely passing through said opening, and a fastening means having a substantially flat bearing surface secured to one end of said rod, said washer comprised of a base portion having an elongate aperture therethrough aligned with the opening in said structure through which said rod loosely passes, said base portion having a first substantially flat face abutting said structure adjacent one end of the aperture in said base portion, a positioning projection projecting from said first face into the opening in said structure, a second face on the opposite side of said base portion from the first face, a pair of spaced bearing ears projecting from said second face located adjacent to the elongate sides of the aperture in said base portion, said bearing ears each having an arcuate bearing surface along its outer periphery against which said fastening means abuts, said ears and apertures so formed as to accommodate angular adjustment of the rod in said aperture and between said ears, said arcuate bearing surface on each load bearing ear formed as an approximately 90° convex arc commencing at the face of said washer and terminating with a relatively short straight bearing extension over the middle portion which is parallel with the first face of said washer, the remainder of the outer periphery of each load bearing ear defining a concave arc extending from said extension to the face of said washer.

2. A washer as in claim 1 wherein the inner wall of said positioning projection is curved in a radius slightly larger than the radius of said rod and wherein said wall is outwardly inclined with respect to the center of the washer.

References Cited

UNITED STATES PATENTS

| 1,904,296 | 4/1933 | Royse | 85—50 |
| 1,937,818 | 12/1933 | French | 85—50 |
| 2,770,161 | 11/1956 | Schutte | 85—50 |
| 3,303,735 | 2/1967 | Fisher | 85—1 |

CARL W. TOMLIN, *Primary Examiner.*

R. S. BRITTS, *Assistant Examiner.*